(12) United States Patent
Ide et al.

(10) Patent No.: US 12,211,301 B2
(45) Date of Patent: Jan. 28, 2025

(54) HOME UI SYSTEM FOR MANAGING DIGITAL INK

(71) Applicant: Wacom Co., Ltd., Saitama (JP)

(72) Inventors: Nobutaka Ide, Saitama (JP); Mu-Tzu Chen, Saitama (JP); Sadao Yamamoto, Saitama (JP); Philipp Daniel Schongen, Duesseldorf (DE); Peter Bacher, Portland, OR (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/476,090

(22) Filed: Sep. 27, 2023

(65) Prior Publication Data

US 2024/0021002 A1 Jan. 18, 2024

Related U.S. Application Data

(63) Continuation of application No. 17/489,472, filed on Sep. 29, 2021, now Pat. No. 11,915,504, which is a
(Continued)

(30) Foreign Application Priority Data

Apr. 8, 2019 (JP) .................................. 2019-073696

(51) Int. Cl.
*G06V 30/32* (2022.01)
*G06F 3/04883* (2022.01)
(Continued)

(52) U.S. Cl.
CPC ........ *G06V 30/333* (2022.01); *G06F 3/04883* (2013.01); *G06F 18/214* (2023.01); *G06F 18/40* (2023.01)

(58) Field of Classification Search
CPC ........ G06F 3/04883; G06F 18/40; G06F 3/01; G06F 18/214; G06V 30/32; G06V 30/333
See application file for complete search history.

(56) References Cited

U.S. PATENT DOCUMENTS

| 7,158,675 B2 | 1/2007 | Gounares et al. |
| 7,397,949 B2 | 7/2008 | Dresevic et al. |

(Continued)

FOREIGN PATENT DOCUMENTS

| CN | 109324745 A | 2/2019 |
| JP | 2003196245 A | 7/2003 |

(Continued)

OTHER PUBLICATIONS

International Search Report, mailed May 12, 2020, for PCT Application No. PCT/JP2020/006006. (5 pages).

*Primary Examiner* — Doon Y Chow
(74) *Attorney, Agent, or Firm* — Seed IP Law Group LLP

(57) ABSTRACT

A home user interface (UI) system for managing digital ink is provided. The home UI system includes a plurality of state sensors capable of detecting a state in a house or a change in the state, and a plurality of home-use devices that are provided in the house or that form part of the house and that each include a handwriting sensor capable of detecting handwriting made by a person. The home UI system further includes one or more notification units that are configured to notify the person of the existence of the home-use device or a detectable region of the handwriting sensor of the home-use device. The home UI system further includes a controller which, when it is determined that a notification is necessary from a detection result of one or more of the state sensors, instructs at least one of the notification units to carry out the notification.

8 Claims, 13 Drawing Sheets

Related U.S. Application Data continuation of application No. PCT/JP2020/006006, filed on Feb. 17, 2020.

(51) Int. Cl.
  *G06F 18/214*   (2023.01)
  *G06F 18/40*    (2023.01)

(56) References Cited

U.S. PATENT DOCUMENTS

| | | | |
|---|---|---|---|
| 9,074,806 B2 | 7/2015 | Cheon et al. | |
| 10,261,589 B2 | 4/2019 | Sakai | |
| 10,296,787 B2 | 5/2019 | Angelov et al. | |
| 11,061,374 B2 | 7/2021 | Young et al. | |
| 11,340,566 B1 | 5/2022 | Raeber et al. | |
| 11,388,021 B2 | 7/2022 | Restrepo Conde et al. | |
| 11,487,417 B2 | 11/2022 | Park et al. | |
| 2003/0107492 A1 | 6/2003 | Lin | |
| 2007/0055757 A1* | 3/2007 | Mairs | H04L 12/2814 709/223 |
| 2012/0260683 A1 | 10/2012 | Cheon et al. | |
| 2013/0113822 A1* | 5/2013 | Putrevu | G06F 40/103 345/619 |
| 2014/0098247 A1* | 4/2014 | Rao | H04L 67/125 455/420 |
| 2015/0160797 A1* | 6/2015 | Shearer | H04L 67/025 715/740 |
| 2015/0163411 A1* | 6/2015 | McCarthy, III | G08B 25/08 348/143 |
| 2015/0296165 A1 | 10/2015 | Sato et al. | |
| 2016/0224239 A1 | 8/2016 | Angelov et al. | |
| 2016/0240060 A1* | 8/2016 | Wang | H04L 12/6418 |
| 2016/0259308 A1 | 9/2016 | Fadell et al. | |
| 2016/0330712 A1* | 11/2016 | Bleakley | H04W 68/04 |
| 2017/0171090 A1* | 6/2017 | Britt | H04L 47/2425 |
| 2019/0187823 A1 | 6/2019 | Kake et al. | |
| 2022/0019781 A1* | 1/2022 | Ide | G06F 3/04883 |

FOREIGN PATENT DOCUMENTS

| | | |
|---|---|---|
| JP | 2010131280 A | 6/2010 |
| JP | 2012123519 A | 6/2012 |
| JP | 2012220186 A | 11/2012 |
| JP | 2013145468 A | 7/2013 |
| JP | 5886487 B1 | 3/2016 |
| JP | 2017137732 A | 8/2017 |
| JP | 2019045911 A | 3/2019 |
| JP | 2020148139 A | 9/2020 |
| WO | 2018043061 A1 | 3/2018 |

\* cited by examiner

| SENSOR ID | SENSOR TYPE | POSITION INFORMATION | RANGE INFORMATION |
|---|---|---|---|
| S0001 | CAMERA | FIRST FLOOR KITCHEN (X1,Y1) | RADIUS: 10m ANGLE OF VIEW: 100° ORIENTATION: SW |
| S0002 | BATHROOM SCALE | FIRST FLOOR BATHROOM (X2,Y2) | 1 m |
| ... | ... | ... | ... |

FIG.3B
44

| FIRST DEVICE ID | DEVICE TYPE | POSITION INFORMATION | RANGE INFORMATION |
|---|---|---|---|
| D1001 | WINDOW | FIRST FLOOR KITCHEN (X3,Y3) | IN KITCHEN |
| D1002 | WALL | FIRST FLOOR BATHROOM (X4,Y4) | IN BATHROOM |
| ... | ... | ... | ... |

FIG.3C
46

| SECOND DEVICE ID | DEVICE TYPE | USER ID | FIRST DEVICE ID |
|---|---|---|---|
| D2001 | WALL | NONE | D1001 |
| D2002 | SPEAKER | NONE | D1003 D1004 D1005 |
| D2003 | SMARTPHONE | User-A | ALL |
| ... | ... | ... | ... |

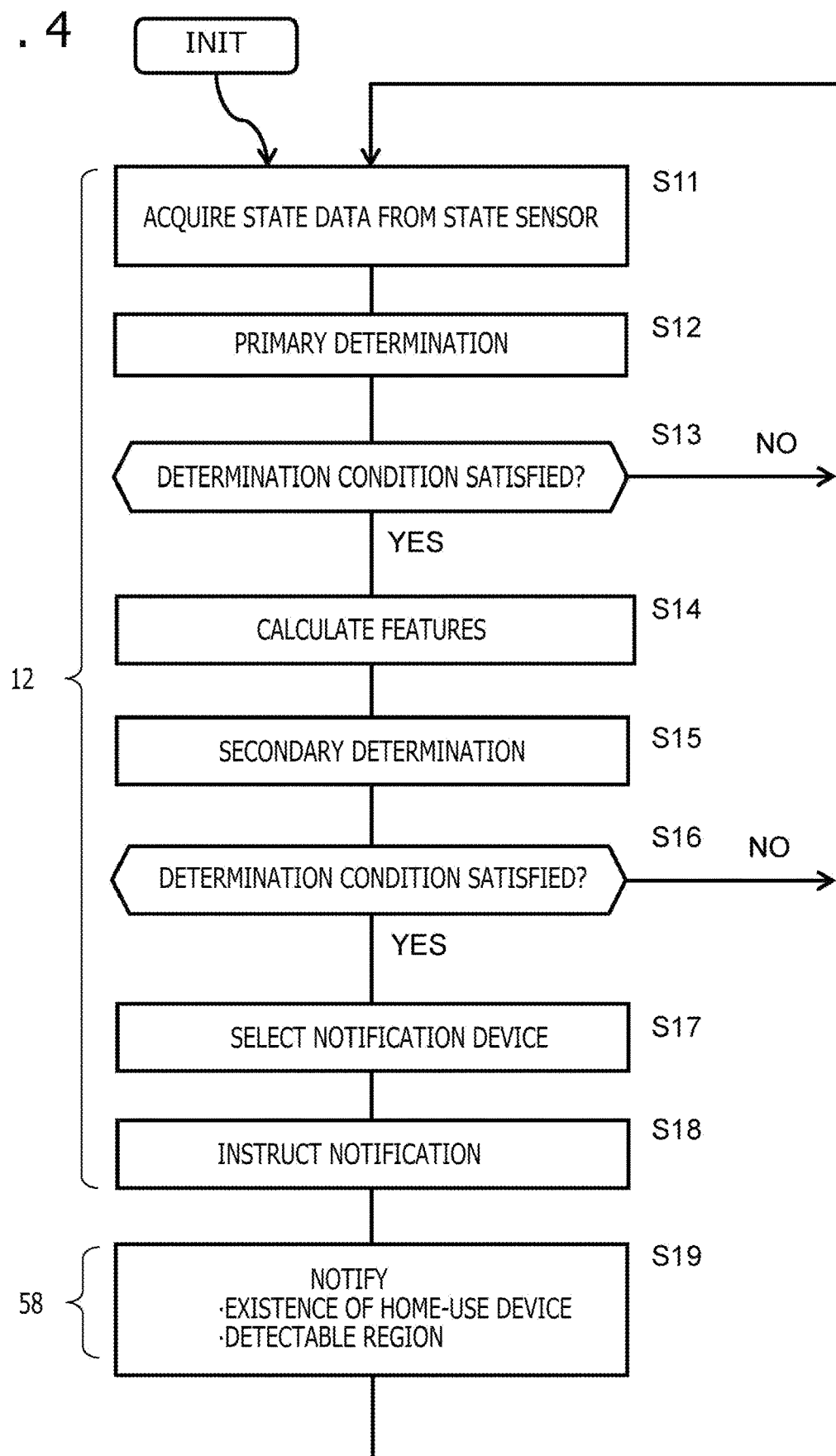

FIG.12A
121
Humpty Dumpty sat on a wall,
Humpty Dumpty had a great fall.
All the king's horses and all the king's men
Couldn't put Humpty together again.
FIG.12B
122
...
1 The Frog-King, or Iron Henry
... The frog answered, "I do not care for thy clothes, thy pearls and jewels, or thy golden crown, but if ..."
...
FIG.12C
123
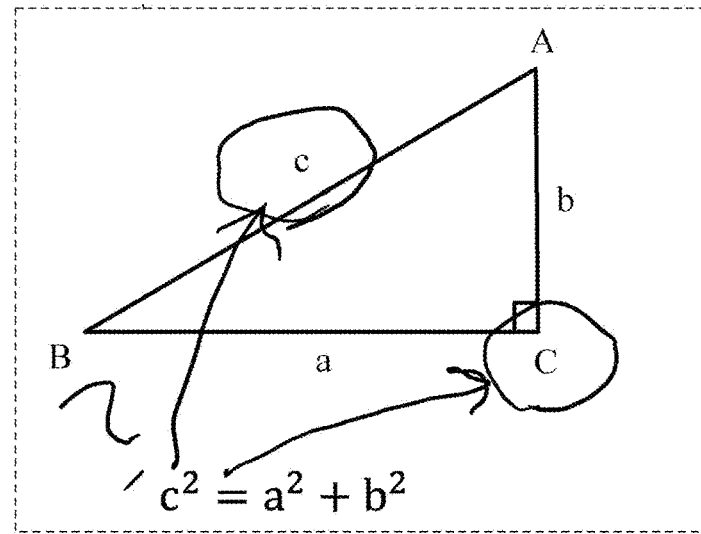

FIG.13A
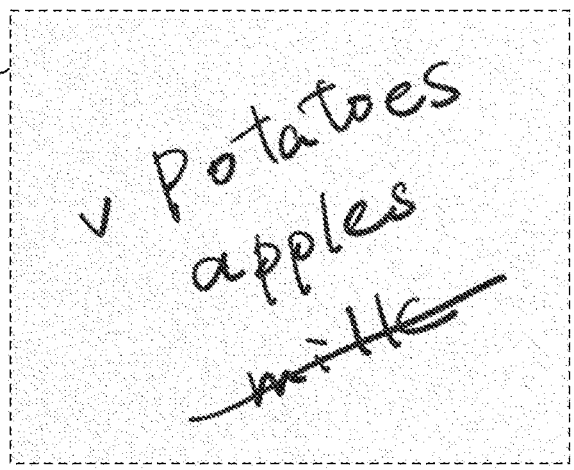
124
FIG.13B
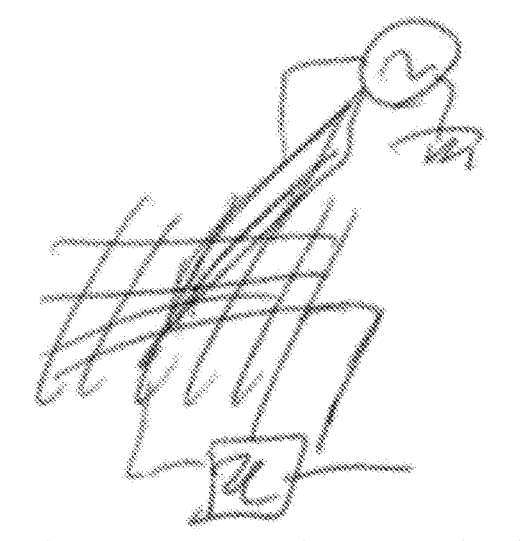
125
FIG.13C
126

HOME UI SYSTEM FOR MANAGING DIGITAL INK

BACKGROUND

Technical Field

The present disclosure relates to a home user interface (UI) system for managing digital ink.

Description of the Related Art

Digital ink generated from an electronic pen is data used to reproduce the trace made by the electronic pen, which is similar to the trace left on paper by a conventional pen used to perform handwriting. An example of digital ink that is an object-based data model residing in a computer is disclosed in U.S. Pat. No. 7,158,675, and an example of a serialization format used for digital ink is disclosed in U.S. Pat. No. 7,397,949.

Another type of digital ink data is known that goes beyond merely reproducing handwritten traces and that enables recording of "when, by whom, where, and in what situation" the handwriting has been performed by a person to leave the trace. For example, Japanese Patent No. 5886487 discloses digital ink that makes it possible to identify who has written stroke data that represents the trace. US Patent Application Publication No. 2016/0224239 discloses digital ink that allows acquisition of information as context data when stroke data is input, such as the author information, pen identification (ID), clock time information, and location information acquired by the global positioning system (GPS), and recording it as metadata.

In recent years, studies have been made to use digital ink to estimate "with what kind of thought or emotion a handwriting has been made." For example, in Japanese Patent Laid-open No. 2010-131280, a method and a device are disclosed that ascertain and determine the mental, psychological, and physiological states of the writing person by quantifying time-space information of handwritten characters or pictures and extracting characteristic features. In International Patent Publication No. WO 2018/043061, an emotion estimation system is disclosed that associates the writing state, such as the writing pressure, with biological information corresponding to emotion, and derives the biological information corresponding to the emotion only from the writing state.

Such digital ink indicating "when, where, and how handwriting has been made" can be considered a trace of a writing person, i.e., history data of the person's action or emotion. Such digital ink can be combined with a personalized artificial intelligence (AI) to support realization of a more advanced life style.

For example, in US Patent Application Publication No. 2016/0259308, a smart home automation system is disclosed that senses an environment in a house or a person's motion and dynamically changes, based on the sensing detection result, a "policy" that characterizes operations of respective home-use devices.

BRIEF SUMMARY

By incorporating a handwriting sensor into a home-use device that is provided in a house or that forms part of the house, the "house itself" can be configured to function as an input-output device of digital ink. However, when each of multiple members of the house can access plural home-use devices, multiple home-use devices or multiple writing persons may coexist at the same time of digital ink input, and multiple pieces of written information may coexist at the same time of digital ink output. Thus, the following operational inconveniences may occur, for example: [1] a use opportunity may be lost when a home-use device is overlooked; [2] the identify of a writing person cannot be determined when one electronic pen is shared by multiple people; and [3] handwriting information fragmentally input from multiple home-use devices cannot be effectively utilized.

An aspect of the present disclosure is directed to providing a home UI system for managing digital ink, when a house itself is configured to function as an input-output device of digital ink, wherein the home UI system is capable of suppressing inconveniences due to multiple home-use devices and multiple writing persons coexisting at the same time of digital ink input, or effectively outputting handwriting information indicated by the digital ink.

A home UI system for managing digital ink in a first aspect of the present disclosure includes a plurality of state sensors capable of detecting a state in a house or a change in the state, a plurality of home-use devices that are provided in the house or that form part of the house and that each include a handwriting sensor capable of detecting handwriting by a person, one or more notification units that notify the person of existence of the home-use device or a detectable region of the handwriting sensor, and a controller that, responsive to a determination based on a detection result from one or more of the plurality of state sensors that a notification is necessary, instructs at least one of the notification units to perform the notification.

A home UI system for managing digital ink in a second aspect of the present disclosure includes a plurality of state sensors capable of detecting a state in a house or a change in the state, a home-use device that is provided in the house or that forms part of the house and that includes a handwriting sensor capable of detecting handwriting by a person, and an estimation unit that, responsive to a detection by the home-use device of a handwriting input, estimates a person who has inputted the handwriting based on a detection result from one or more of the plurality of state sensors.

A home UI system for managing digital ink in a third aspect of the present disclosure includes a plurality of home-use devices that are provided in a house or that form part of the house and that each include a handwriting sensor capable of inputting handwriting by a person, a storage device that stores handwriting data indicating a form of handwriting in such a manner as to associate the handwriting data with the home-use device, a terminal device configured to display an image or a video and associated with one or more of the plurality of home-use devices, and a controller that, in response to receiving a predetermined operation through the terminal device, acquires handwriting data of the home-use device associated with the terminal device from the storage device, and instructs the terminal device to display written-by-hand information indicated by the acquired handwriting data or content information specified by the acquired handwriting data.

A home UI system for managing digital ink in a fourth aspect of the present disclosure includes a plurality of state sensors capable of detecting a state in a house or a change in the state, a home-use device that is provided in the house or that forms part of the house and that includes a touch panel display capable of inputting and outputting handwriting by a person, a storage device that stores handwriting data indicating a form of handwriting in such a manner as to associate the handwriting data with the home-use device, and a controller that, in response to one or more of the plurality of state sensors detecting a predetermined state of a person who exists near the home-use device, acquires handwriting data associated with the home-use device from the storage device, and instructs the home-use device to display written-by-hand information indicated by the acquired handwriting data.

According to the first aspect of the present disclosure, the inconvenience due to coexistence of multiple home-use devices at the time of digital ink input can be avoided.

According to the second aspect of the present disclosure, the inconvenience due to coexistence of multiple writing persons at the time of digital ink input can be avoided.

According to the third and fourth aspects of the present disclosure, the handwriting information indicated by digital ink can be effectively output.

BRIEF DESCRIPTION OF THE SEVERAL VIEWS OF THE DRAWINGS

FIG. 3B is a diagram illustrating one example of a data structure of first device information in the environmental information DB;

FIG. 3C is a diagram illustrating one example of a data structure of second device information in the environmental information DB;

FIG. 4 is a flowchart of a first operation of the home UI system;

FIG. 12A is a diagram illustrating a first example of a display on the home-use device;

FIG. 12B is a diagram illustrating a first example of a display on the home-use device;

FIG. 12C is a diagram illustrating a first example of a display on the home-use device;

FIG. 13A is a diagram illustrating a second example of a display on the home-use device;

FIG. 13B is a diagram illustrating a second example of a display on the home-use device; and FIG. 13C is a diagram illustrating a second example of a display on the home-use device.

DETAILED DESCRIPTION

A home UI system that manages digital ink in the present disclosure will be described with reference to the accompanying drawings.

Configuration of Home UI System 10

Overall Configuration

Figure 1:
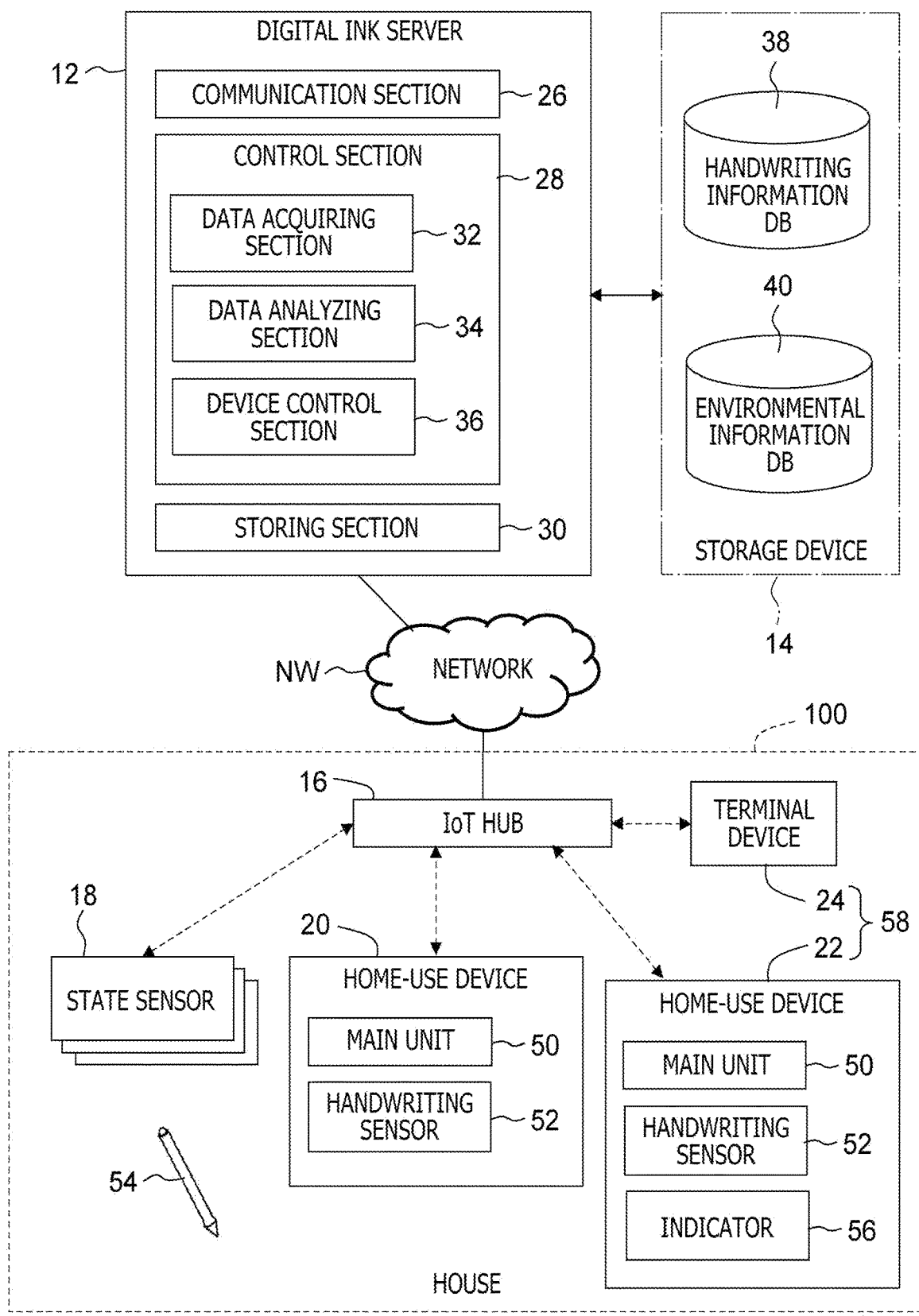
FIG. 1 is an overall configuration diagram of a home UI system in one embodiment of the present disclosure.

FIG. 1 is an overall configuration diagram of a home UI system 10 in one embodiment of the present disclosure. The home UI system 10 is configured to be capable of providing a "ubiquitous ink service" which supports input and output operations of handwriting information at various locations in a house 100. The home UI system 10 may be implemented not only in the house 100 but in various other private spaces. Specifically, the home UI system 10 may be configured to include a digital ink server 12, a storage device 14, an Internet of Things (IoT) hub 16, plural state sensors 18, plural home-use devices 20 and 22, and a terminal device 24.

The digital ink server 12 is a computer that carries out comprehensive control relating to input and output of digital ink, and is specifically configured to include a communication section 26, a control section 28, and a storing section 30.

The communication section 26 is an interface that transmits and receives an electrical signal to and from an external device. The control section 28 comprises an arithmetic processing device including a central processing unit (CPU) and a graphics processing unit (GPU). The control section 28 functions as a data acquiring section 32, a data analyzing section 34, and a device control section 36 (controller), by reading out a program stored in the storing section 30 and executing the program.

The storing section 30 comprises a non-transitory, computer-readable storage medium. Here, the computer-readable storage medium is a portable medium such as a magneto-optical disc, a read-only memory (ROM), a compact disc (CD)-ROM, or flash memory or a storage device such as a hard disk incorporated in a computer system.

The storage device 14 comprises a hard disk drive (HDD) or a solid state device (SSD), for example, and stores various pieces of data to be handled by the digital ink server 12. Specifically, the storage device 14 includes a database that accumulates handwriting information generated in the life within the house 100 (hereinafter, handwriting information DB 38) and a database that accumulates environmental information of the house 100 (hereinafter, environmental information DB 40).

The IoT hub 16 is a relay equipment that can bi-directionally communicate with each piece of IoT equipment that exists in the house 100. This allows each piece of IoT equipment to supply its own data to the digital ink server 12 through the IoT hub 16 and a network NW. The digital ink server 12 can instruct each piece of IoT equipment to carry out any necessary operation through the network NW and the IoT hub 16. In the example of this diagram, the IoT equipment includes the state sensor 18, the home-use device 20 or 22, and the terminal device 24.

The state sensor 18 is a sensor that detects a state in the house 100 or a change in the state. The state in the house 100 may be an internal state of the house 100 or may be the state of a person Hm who is present in the house 100. The internal state of the house 100 may include an environmental state such as the state of air, light, and sound, the arrangement or use state of the home-use devices 20 and 22, and so forth. The state of person Hm may include the position, posture, motion, physical condition, emotion, and so forth of person Hm.

Various kinds of state sensors 18 may be used according to the detection target, the room layout of the house 100, the installation cost, and so forth. For example, the state sensors 18 may be non-contact-type sensors including a camera, an illuminometer, a thermo-hygrometer, a sound sensor, an ultrasonic sensor, a motion sensor, and an infrared sensor, and may be contact-type sensors including a pressure sensor, a touch sensor, and a motion sensor. The state sensors 18 may be stationary-type sensors arranged in the house 100 and may be portable-type sensors (which may additionally be wearable-type or non-wearable-type) brought into the house 100.

The home-use devices 20 and 22 are devices that are provided in the house 100 or that form part of the house 100. As examples of the former, home appliances (including a terminal device to be described later), furniture, home accessories and equipment, and so forth may be provided as the home-use devices. As examples of the latter, the home-use devices may form a wall, a floor, a window, a pillar, and so forth, of the house 100. The home-use devices 20 and 22 are each configured to include a main unit 50 for executing its own functions and a handwriting sensor 52 that can detect handwriting made by person Hm. The handwriting sensor 52 is configured to include plural sensor electrodes for detecting the position of an electronic pen 54 or a finger. The electronic pen 54 is, for example, a stylus of an active capacitive system (AES) or an electromagnetic induction system (EMR).

The home-use device 22 further includes an indicator 56, in addition to the main unit 50 and the handwriting sensor 52, differently from the other home-use device 20. The indicator 56 is an indicating instrument that can output information that appeals to the five senses of person Hm, and may comprise a lamp, a speaker, a vibrator, or a display, for example. This allows the home-use device 22 to indicate its own existence or its detectable region.

The terminal device 24 may be a multi-function, multi-purpose device, such as a personal computer, a tablet, a smartphone, and an AI speaker, for example. The terminal device 24 may be a stationary device or may be a portable device. Hereinafter, devices that can inform person Hm through output of information will be collectively referred to as "notification devices 58" in some cases (the home-use device 22 and the terminal device 24 in the example of FIG. 1).

Figures 2, 3A:
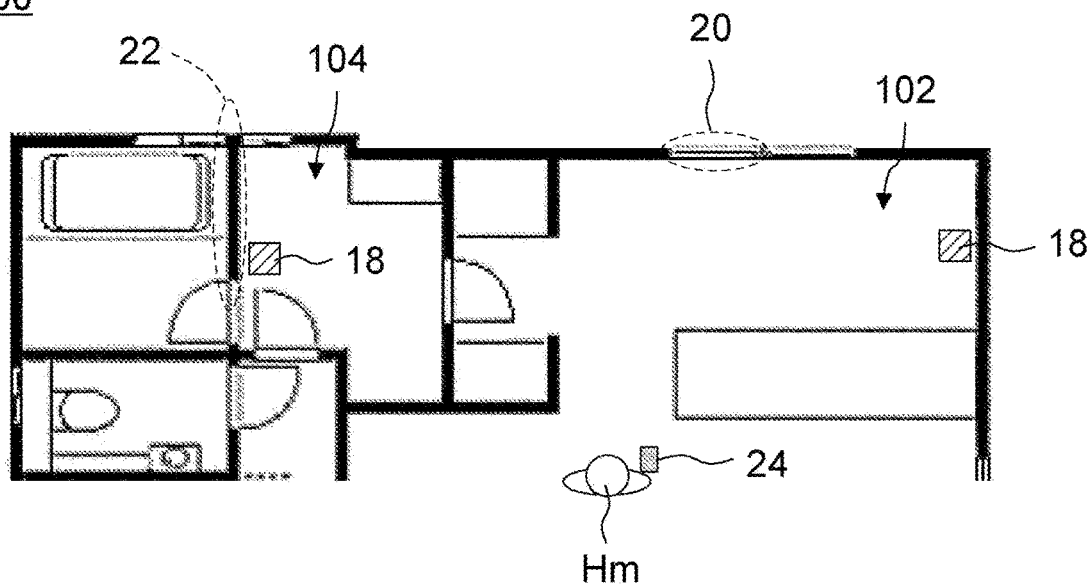
FIG. 2 is a diagram illustrating one example of a partial layout of a house in FIG. 1.
FIG. 3A is a diagram illustrating one example of a data structure of sensor information in an environmental information database (DB)

FIG. 2 is a diagram illustrating one example of a partial layout of the house 100 in FIG. 1. In a kitchen 102 of the house 100, a camera as the state sensor 18 and a window as the home-use device 20 are provided. In a bathroom 104 of the house 100, a bathroom scale as the state sensor 18 and a wall as the home-use device 22 are provided. Furthermore, person Hm who is a living member of the house 100 possesses a smartphone as the terminal device 24.

FIG. 3A to FIG. 3C are diagrams illustrating one example of data structures of the environmental information DB 40 in FIG. 1. More specifically, FIG. 3A illustrates sensor information 42, and FIG. 3B illustrates first device information 44, and FIG. 3C illustrates second device information 46. In the environmental information DB 40, map data indicating the room layout of each house 100 is also stored together.

As illustrated in FIG. 3A, the sensor information 42 is table data that indicates the correspondence relation among "sensor ID" that is identification information of the state sensor 18, "sensor type" that indicates the type, "position information" that indicates the location, and "range information" that indicates the detectable range. The position information may be, for example, a floor, a room, a compartment, or relative coordinates from absolute coordinates (for example, latitude and longitude) or a reference point. The range information may include various kinds of information that can define the detection range. For example, the range information may be geometric information including the coordinates of a characteristic location point, the length of a boundary line, the radius, and the angle range, or may be the name of a compartment or a section (for example, a kitchen or a bathroom).

As illustrated in FIG. 3B, the first device information 44 is table data that indicates the correspondence relation among "first device ID" that is identification information of the home-use devices 20 and 22, "device type" that indicates the type, "position information" that indicates the location, and "range information" that indicates the accessible range. Here, the "accessible range" means the range in which person Hm present in the range can visually recognize the home-use device 20 or 22 or the range in which person Hm in the range can touch the home-use device 20 or 22.

As illustrated in FIG. 3C, the second device information 46 is table data that indicates the correspondence relation among "second device ID" that is identification information of the notification device 58, "device type" that indicates the type, "user ID" that is identification information of the owner, and "first device ID" of the home-use devices 20 and 22 associated with the notification device 58. For example, when the notification device 58 is the home-use device 22 (including the indicator 56), this home-use device 22 may be designated as the notification device 58. On the other hand, when the notification device 58 is the home-use device 20 (without the indicator 56), the terminal device 24 may be designated as the notification device 58.

First Operation

The foregoing has described the configuration of the home UI system 10 in the present embodiment. The following describes operations of the home UI system 10 including a first, second, third, and fourth operations.

When the handwriting sensor 52 is incorporated into the home-use device 20 or 22, to improve the appearance of a product, the home-use device 20 or 22 may be designed such that the form of the handwriting sensor 52 is inconspicuous. In the case of arranging the home-use device 20 or 22 in a well-blended manner in the house 100, due to the camouflage effect (or the stealth effect), it may become difficult for a user to determine the existence of the handwriting sensor 52 or the position of the detectable region that blends in the ambient environment. A similar phenomenon may also occur when the inside of the house 100 is dark, or when the home-use device 20 or 22 is misarranged so that its detection surface is hidden.

Thus, the home UI system 10 carries out the "first operation" to timely notify the location of the home-use device 20 or 22 or the detectable range of the handwriting sensor 52 to a user who may be present. The first operation will be described below with reference to a flowchart of FIG. 4 and FIGS. 5-6C.

Flow of First Operation

In a step S11 in FIG. 4, the data acquiring section 32 of the digital ink server 12 acquires data that indicates a state in the house 100 or a change in the state (hereinafter, referred to also as "state data") from one or plural state sensors 18.

In a step S12, the data analyzing section 34 carries out primary determination relating to whether or not a notification to be described later is necessary, by using the state data acquired in the step S11. Specifically, the data analyzing section 34 analyzes the state data from multiple perspectives or in a time-series manner by using various analytical methods including sensor fusion, and checks whether or not a predetermined motion by person Hm has been detected. Here, the "predetermined motion" means a motion that is a precursor of a writing operation on the home-use device 20 or 22. For example, a predetermined motion may be [1] a motion of approaching the front of a refrigerator and stopping there, or [2] a motion of stepping on a bathroom scale. The former corresponds to a "precursor" of a series of actions in which person Hm opens a door of the refrigerator, checks the content therein, closes the door of the refrigerator, and makes a note of food items that need to be additionally bought. The latter corresponds to a "precursor" of a series of actions in which a person gets on the bathroom scale, checks the measurement result, steps off the bathroom scale, and makes a note of the measurement result.

In a step S13, the data analyzing section 34 checks whether or not the determination result in the step S12 satisfies a primary determination condition. When the determination condition is not satisfied (step S13: NO), the operation returns to the step S11 and the steps S11 to S13 are sequentially repeated until the condition is satisfied. On the other hand, when the determination condition is satisfied (step S13: YES), the operation proceeds to the next step S14.

In the step S14, the data analyzing section 34 calculates plural features used for secondary determination to be described later from the state data acquired in the step S11 or state data additionally acquired. For example, when the state sensor 18 is a camera, "physical features" may be extracted including characteristics of the face, the height, the body shape, and the clothes of the writing person, or "motion features" may be extracted including the writing person's dominant hand and habits of writing. When the state sensor 18 is a body measuring instrument, the physical features including the weight, the body fat percentage, and the body composition of the writing person may be extracted. When the state sensor 18 is a microphone, the physical features including the voiceprint and the voice volume of the writing person may be extracted, and "emotional features" that represent the state of delight, anger, sorrow, and pleasure may be extracted.

In a step S15, the data analyzing section 34 carries out secondary determination relating to whether or not a notification to be described later is necessary, by using the features calculated in the step S14. For example, the data analyzing section 34 can determine whether or not a notification is necessary depending on whether or not plural individual conditions are all satisfied or by converting satisfaction and non-satisfaction of the plural individual conditions to a score. Alternatively, the data analyzing section 34 may carry out the determination with higher accuracy by using a determination implement 70 in which machine learning has been carried out.

Figure 5:
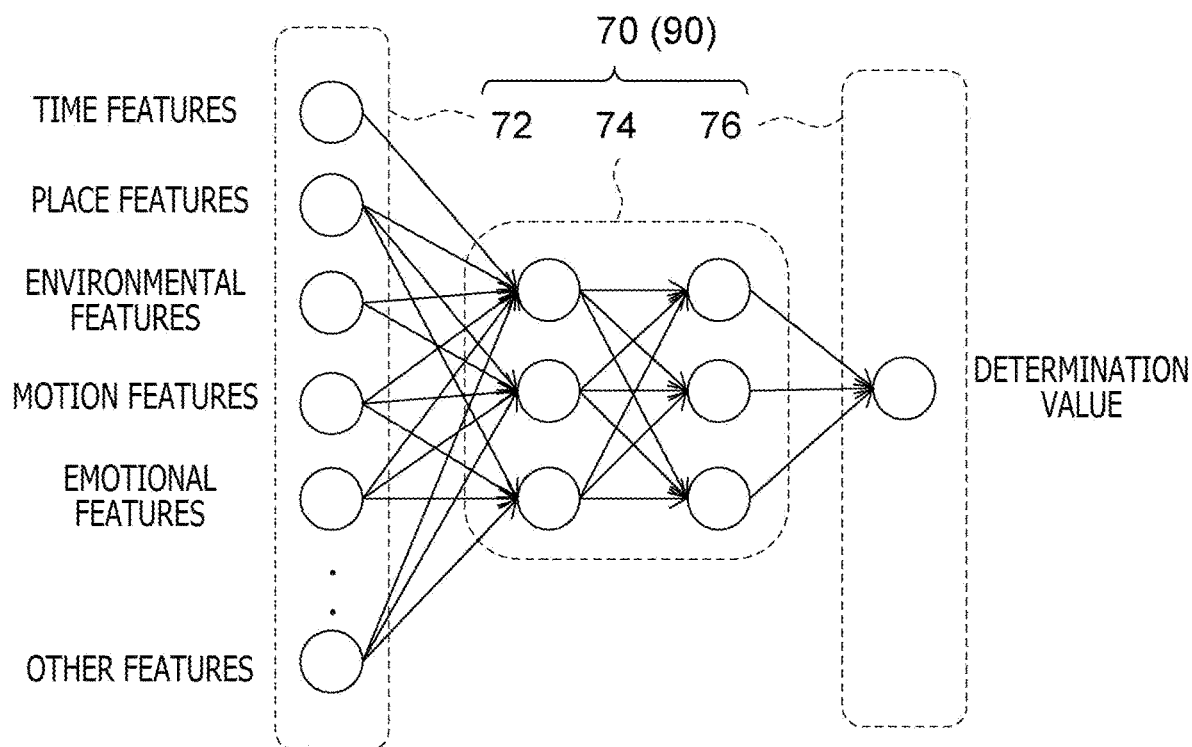
FIG. 5 is a diagram illustrating the configuration of a determination implement included in a data analyzing section of FIG. 1.

FIG. 5 is a diagram illustrating the configuration of the determination implement 70 included in the data analyzing section 34 of FIG. 1. The determination implement 70 is configured of a hierarchical neural network composed of an input layer 72, intermediate layers 74, and an output layer 76, for example. The calculation rule of the determination implement 70 is defined based on values of a learning parameter group that is an aggregation of learning parameters. For example, the learning parameter group may include coefficients that describe an activation function of a unit corresponding to a neuron, weighting factors corresponding to the strength of a synaptic connection, the numbers of units that configure the respective layers, and the number of intermediate layers 74. The learning parameter group is stored in the storing section 30 (FIG. 1) in the state in which the respective values are settled at the end of the learning, and is timely read out as needed.

The input layer 72 is a layer to which a feature relating to the state of person Hm or a change in the state is input, and is composed of plural units. This feature is an input vector including at least one kind of component in "time features" relating to the writing timing, "place features" relating to the writing place, "environmental features" relating to the internal environment of the house 100, "motion features" relating to the motion of the writing person, "emotional features" relating to the emotion of the person, and other features. The output layer 76 is a layer that outputs a determination value and that is composed of one unit in the example of FIG. 5. The determination value is an index normalized in a range of [0, 1], for example. A larger value thereof indicates a determination result indicating that a notification need is higher and a smaller value thereof indicates a determination result indicating that the notification need is lower.

Although the determination implement 70 is constructed by using the neural network in the above-described example, the method of machine learning is not limited thereto. For example, various methods including a logistic regression model, support vector machine (SVM), decision tree, random forest, and boosting may be used.

In a step S16, the data analyzing section 34 checks whether or not the determination result in the step S15 satisfies a secondary determination condition. Here, the data analyzing section 34 determines that the determination condition is satisfied when the determination value output from the determination implement 70 is larger than a threshold (for example, 0.7). On the other hand, the data analyzing section 34 determines that the determination condition is not satisfied when the determination value is equal to or smaller than the threshold. When the determination condition is not satisfied (step S16: NO), the operation returns to the step S11 and the steps S11 to S16 are sequentially repeated until the condition is satisfied. On the other hand, when the determination condition is satisfied (step S16: YES), the operation proceeds to the next step S17.

In the step S17, the device control section 36 selects at least one notification device 58 suitable to the state of person Hm, among one or more notification devices 58 usable in the house 100. Specifically, the device control section 36, by collating the sensor information 42 and the first device information 44, extracts the ID of the home-use device 20 or 22 regarding which the detectable range and the accessible range partially overlap (that is, the first device ID). The device control section 36 refers to the second device information 46 and extracts the ID of one or plural notification devices 58 corresponding to the first device ID (that is, the second device ID).

In a step S18, the device control section 36 instructs the notification device 58 selected in the step S17 to carry out the notification relating to the home-use device 20 or 22. Specifically, the device control section 36 sends out a command signal to instruct the notification toward the notification device 58 that is the transmission destination.

The notification device 58 receives the command signal from the digital ink server 12 via the network NW and the IoT hub 16.

In a step S19, the notification device 58 notifies the existence of the home-use device 20 or 22 or the detectable range of the handwriting sensor 52 to person Hm who is present nearby, using the output form according to the output function of the notification device.

Figure 6A:
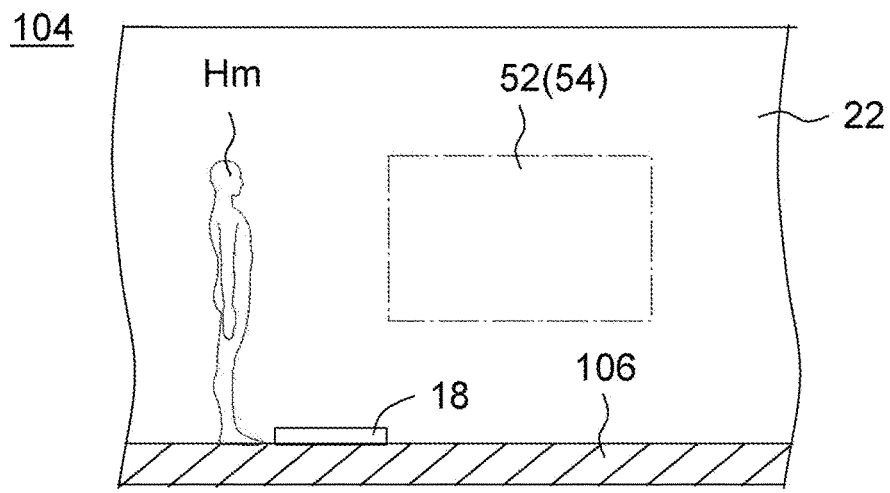
FIG. 6A is a diagram illustrating one example of notification by a home-use device.
Figure 6B:
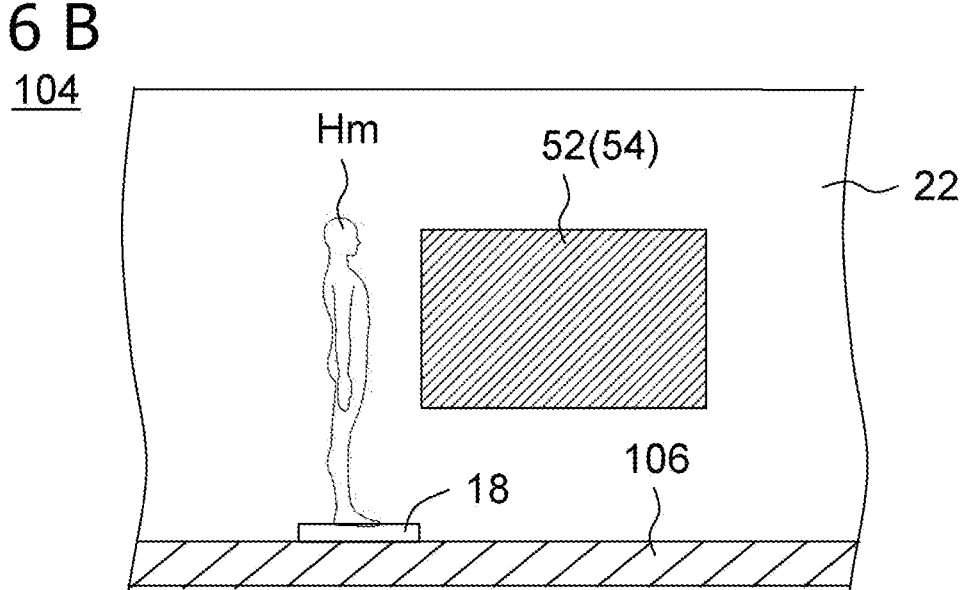
FIG. 6B is a diagram illustrating the one example of notification by the home-use device.
Figure 6C:
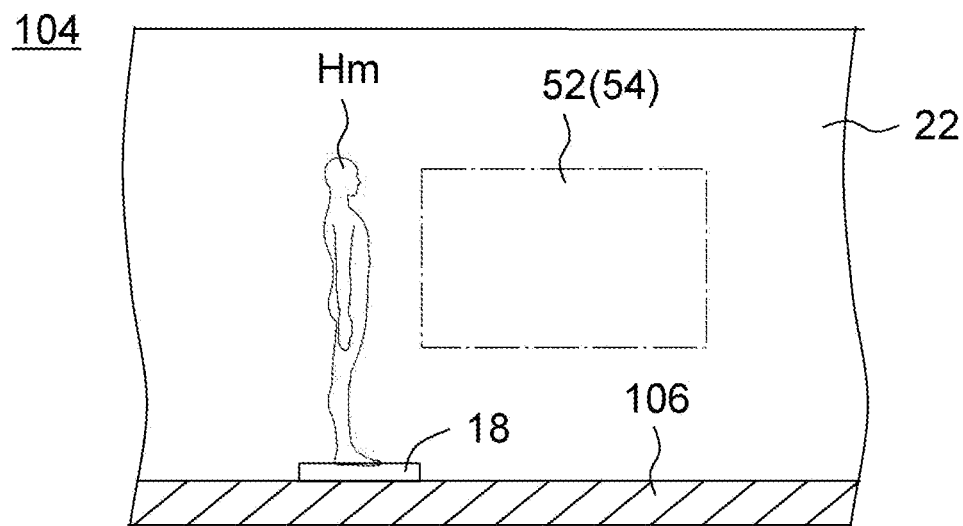
FIG. 6C is a diagram illustrating the one example of notification by the home-use device.

FIG. 6A to FIG. 6C are diagrams illustrating one example of notification by the home-use device 22. All diagrams are partial side views of the bathroom 104 illustrated in FIG. 2, and illustrate the states before and after person Hm steps on a bathroom scale (state sensor 18) that is placed on a floor 106.

As illustrated in FIG. 6A, before person Hm steps on the bathroom scale, a display (indicator 56, which may coincide with the handwriting sensor 52 in FIG. 6A) buried in a wall (home-use device 22) is turned off. In this case, the primary determination condition (step S13 in FIG. 4) is not satisfied and therefore the steps S11 to S13 are repeatedly carried out.

Then, as illustrated in FIG. 6B, when person Hm steps on the bathroom scale, the primary and secondary determination conditions (steps S13 and S16 in FIG. 4) are both satisfied and the display on the wall starts emitting light from the entire screen. Person Hm can determine the detectable range of the handwriting sensor 52 by visually observing the light emission.

Then, as illustrated in FIG. 6C, after a predetermined time has elapsed from the start of the light emission by the display, the display on the wall is turned off although person Hm is still on the bathroom scale. This reduces the power consumption compared with the case in which the light emission is continued.

Thereafter, the operation returns to the step S11 in FIG. 4, and the operation according to the flowchart is repeatedly carried out to successively execute the first operation of the home UI system 10.

The digital ink server 12 may carry out, concurrently with the first operation, reinforcement learning for the determination implement 70 (FIG. 5) that carries out the secondary determination. Example of the learning scheme for reinforcement include: [1] learning in which "whether or not a notification is made" is used as the action selection and "the existence of handwriting input" is used as the reward, [2] learning in which "plural notification forms" are used as the action selection and "the existence of reaction by person Hm" is used as the reward, [3] learning in which "plural contents of notification" are used as the action selection and "the existence of reaction by person Hm" is used as the reward, [4] learning in which "plural home-use devices 22" are used as the action selection and "that a selection has been made" is used as the reward, and so forth.

Similarly, the digital ink server 12 may carry out similar learning (that is, cleansing processing of conditions) also for the primary determination. For example, in the case of carrying out the primary determination depending on whether or not plural individual conditions are all satisfied, correction, deletion, and addition of the individual conditions may be carried out in such a manner that the overall percentage of correct answers becomes higher. Alternatively, in the case of carrying out the primary determination by converting the satisfaction and non-satisfaction of the plural individual conditions to a score, weighting factors of the individual conditions may be adjusted in such a manner that the overall percentage of correct answers becomes higher.

Summary of First Operation

As described above, the home UI system 10 that manages digital ink includes the plural state sensors 18 capable of detecting a state in the house 100 or a change in the state, and the plural home-use devices 20 and 22 that are arranged in the house 100 or that form part of the house 100 and that each include the handwriting sensor 52 capable of detecting handwriting by person Hm. The home UI system 10 also includes one or more notification devices 58 (notification units) that notify the existence of the home-use device 20 or 22 or the detectable region of the handwriting sensor 52 to person Hm, and the device control section 36 (controller) that instructs at least one notification device 58 to carry out the notification when it is determined that the notification is necessary from a detection result of one or more state sensors 18.

In an notification method and an notification program that use the home UI system 10, the digital ink server 12 as a computer carries out an instruction step (S18 in FIG. 4) of instructing at least one notification device 58 to carry out the notification when it is determined that the notification is necessary from a detection result of one or more state sensors 18. This enables timely notification to person Hm, taking into account the state, or a change in the state, of person Hm who is highly likely to use of the home-use device 20 or 22. This avoids creating the inconvenience (here, a loss of an opportunity for use) that may otherwise arise due to multiple home-use devices 20 and 22 coexisting at the time of digital ink input.

The data analyzing section 34 (determining part) may determine whether or not a notification is necessary by using the determination implement 70 that uses at least one feature indicating a detection result of the state sensor 18 on the input side and that uses the determination value indicating whether or not a notification is necessary on the output side. The device control section 36 may instruct the notification according to the determination result by use of the determination implement 70. The determination implement 70 may be configured to allow the learning parameter group defining the calculation rule to be updated by reinforcement learning.

Second Operation

For example, a situation is contemplated in which plural members of the house 100 share one electronic pen 54. In this case, it is not possible to use identification information (hereinafter, pen ID) of the electronic pen 54 to identify the actual writing person. Thus, the home UI system 10 may be configured to perform the "second operation" to estimate the writing person without a separate input operation. The second operation will be described below with reference to a flowchart of FIG. 7 and FIG. 8.

Flow of Second Operation

In a step S21 in FIG. 7, the data acquiring section 32 of the digital ink server 12 checks whether or not data that indicates handwriting by person Hm (hereinafter, referred to also as "handwriting data") has been acquired from any one of the plural home-use devices 20 and 22 arranged in the house 100. When the handwriting data has not yet been acquired (step S21: NO), the operation stays in the step S21 until the handwriting data is acquired. On the other hand, when the handwriting data has been acquired (step S21: YES), the operation proceeds to the next step S22.

In the step S22, the data acquiring section 32 acquires state data of the home-use device 20 or 22 that is the acquisition source of the handwriting data acquired in the step S21. Specifically, the data acquiring section 32 collates the sensor information 42 of FIG. 3A and the first device information 44 of FIG. 3B and acquires the state data from one or more state sensors 18 regarding which the detectable range and the accessible range partly overlap.

In a step S23, the data analyzing section 34 calculates features from the state data acquired in the step S22. This calculation is an operation similar to the calculation made in the step S14 in FIG. 4, and thus specific description thereof is omitted.

In a step S24, the data analyzing section 34 estimates the writing person who has inputted handwriting by using the features calculated in the step S23. For example, when a reference value of the feature is stored regarding each member of the house 100, the data analyzing section 34 quantitatively evaluates the degree of similarity of the feature regarding each member, and estimates that the member with the maximum evaluation value is the writing person. Alternatively, the data analyzing section 34 may carry out estimation with higher accuracy by using a discrimination implement 80, in which machine learning has been carried out.

Figure 8:
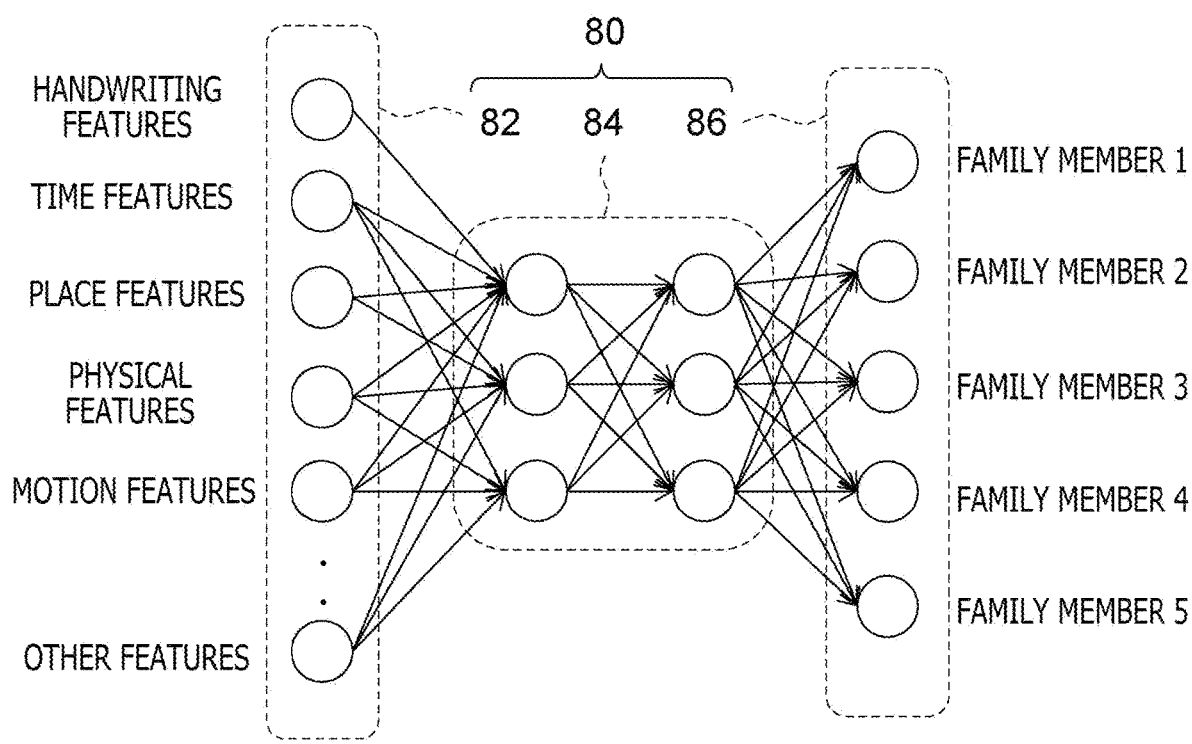
FIG. 8 is a diagram illustrating the configuration of a discrimination implement included in the data analyzing section of FIG. 1.

FIG. 8 is a diagram illustrating the configuration of the discrimination implement 80 included in the data analyzing section 34 of FIG. 1. The discrimination implement 80 is configured by a hierarchical neural network composed of an input layer 82, intermediate layers 84, and an output layer 86, for example. The definition of the learning parameter group may be the same as with the determination implement 70 of FIG. 5 or may be different. Although the discrimination implement 80 is constructed by using the neural network in the above-described example, the method of machine learning is not limited thereto.

The input layer 82 is a layer to which a feature relating to the state in which writing has been carried out is input, and is composed of plural units. This feature is an input vector including at least one kind of component in "handwriting features" relating to the form of handwriting, "time features" relating to the writing timing, "place features" relating to the writing places, "physical features" relating to the body of the writing person, "motion features" relating to the motion of the writing person, and other features.

The output layer 86 is a layer that outputs a group of labels of members of the house 100, and is composed of five units in the example of FIG. 8. The group of the labels is an output vector having label values that represent the likelihood of family members 1 to 5 as five components. For example, it is estimated that the writing person is "family member 1" when the label value of "family member 1" is the largest in the output label group regarding the label values normalized to a range of [0, 1].

In a step S25, the digital ink server 12 supplies the handwriting data acquired in the step S21 to the storage device 14 together with identification information of the writing person estimated in the step S24 (that is, user ID). Therefore, the handwriting data is accumulated in the handwriting information DB 38 in the state of being associated with the proper user ID.

Figure 7:
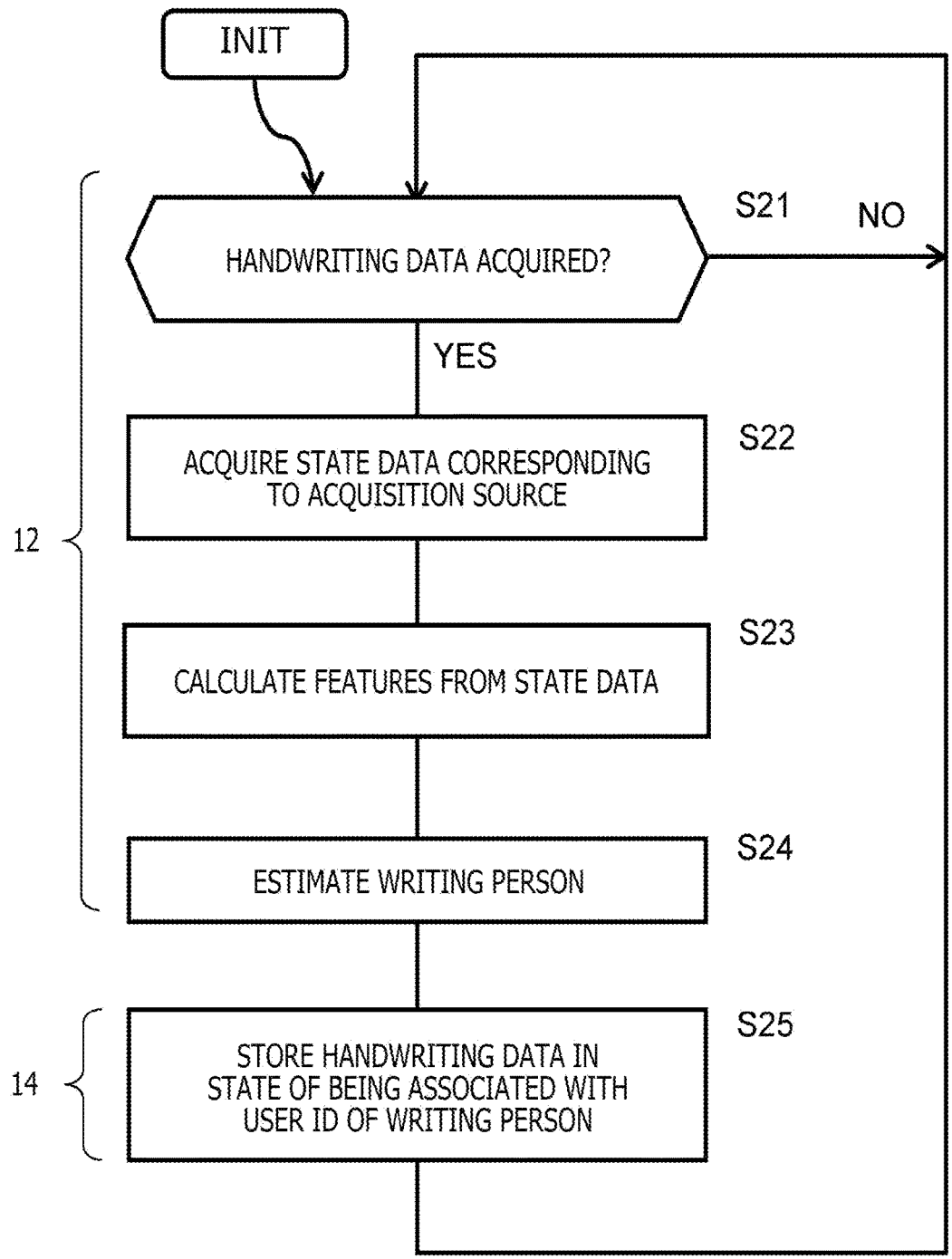
FIG. 7 is a flowchart of a second operation of the home UI system.

Thereafter, the operation returns to the step S21 in FIG. 7, and the operation according to the flowchart is repeatedly carried out to successively execute the second operation of the home UI system 10.

Effects of Second Operation

As described above, the home UI system 10 that manages digital ink includes the plural state sensors 18 capable of detecting a state in the house 100 or a change in the state, and the home-use device 20 or 22 that is arranged in the house 100 or that forms part of the house 100 and that includes the handwriting sensor 52 capable of detecting handwriting by person Hm. The home UI system 10 also includes the data analyzing section 34 (estimation unit) that, when an input of the handwriting is detected by the home-use device 20 or 22, estimates the writing person who has inputted the handwriting by using a detection result of one or more of the state sensors 18.

In an estimation method and an estimation program that use the home UI system 10, the digital ink server 12 as a computer carries out an estimation step (S24 in FIG. 7) of estimating, when an input of the handwriting is detected by the home-use device 20 or 22, the writing person who has inputted the handwriting by using a detection result of one or more of the state sensors 18. This allows for high-accuracy estimation of the wiring person taking into account the state of the writing person or a change in the state. This avoids creating the inconvenience (here, a mistake in associating data) that may otherwise arise due to multiple writing persons coexist at the time of digital ink input.

Third Operation

For example, a use case is considered in which the same person Hm writes down multiple ideas as they come to mind while living in the house 100, each time on the nearest home-use device 20 or 22. However, if multiple pieces of information are fragmentally accumulated, this may not lead to any new creation. Thus, the home UI system 10 may be configured to perform the "third operation" to more effectively present the written information that has been written down by person Hm in the past. The third operation will be described below with reference to a flowchart of FIG. 9 and FIG. 10A and FIG. 10B.

Flow of Third Operation

Figure 9:
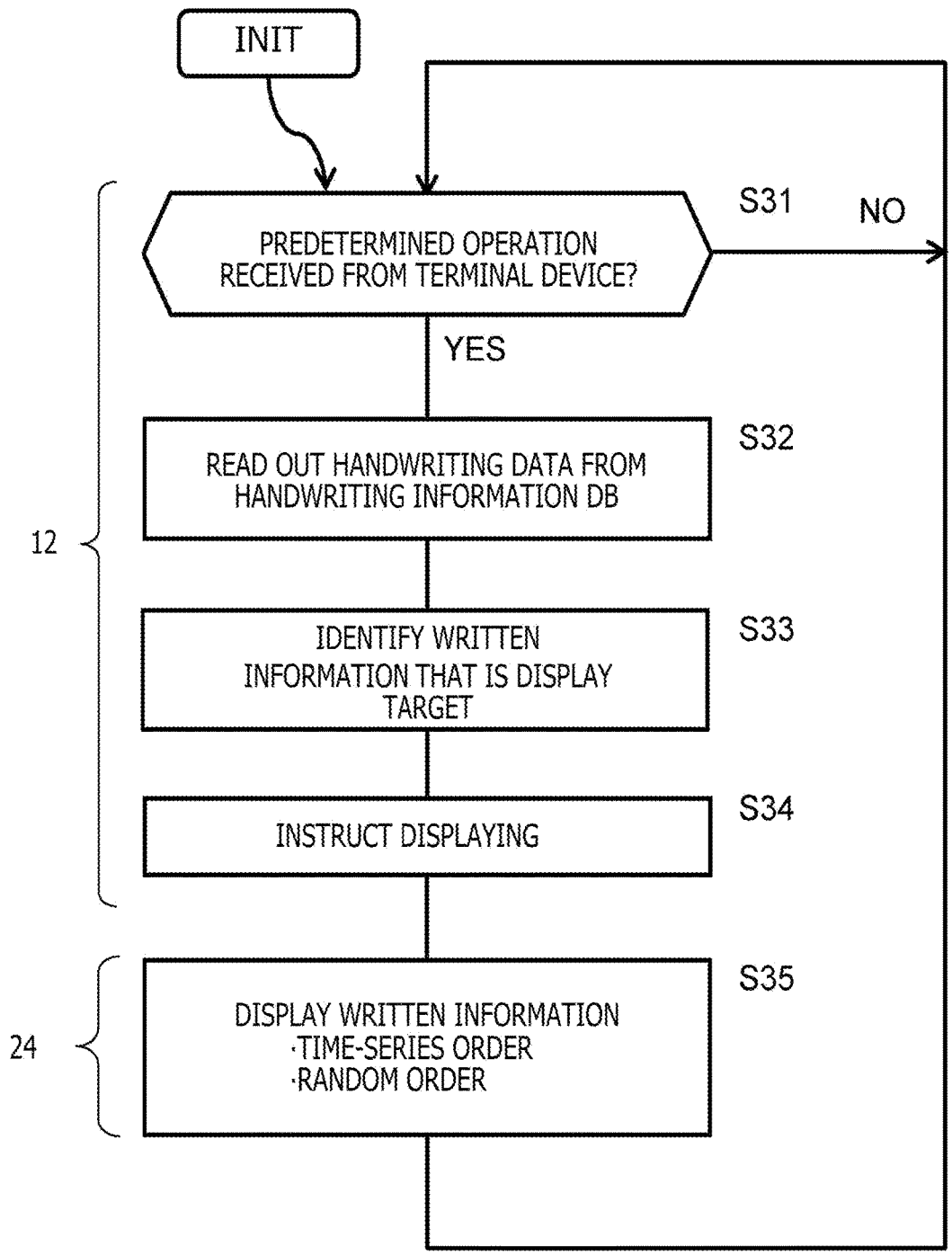
FIG. 9 is a flowchart of a third operation of the home UI system.

In a step S31 in FIG. 9, the control section 28 of the digital ink server 12 checks whether or not a predetermined operation is received from (or on) the terminal device 24. The "predetermined operation" may be, for example, an operation of activating a viewing application of digital ink and tapping a button on a viewing screen. When the predetermined operation has not been received (step S31: NO), the operation stays in the step S31 until the predetermined operation is received. On the other hand, when the predetermined operation has been received (step S31: YES), the third operation proceeds to the next step S32.

In the step S32, the data acquiring section 32 reads out desired handwriting data from the handwriting information DB 38. Prior to this reading-out, the data acquiring section 32 identifies the second device ID of the terminal device 24 by referring to the second device information 46 and acquires one or more first device IDs associated with the second device ID. Thereafter, the data acquiring section 32 reads out, from the handwriting information DB 38, the user ID of the owner of the terminal device 24 and at least part of handwriting data associated with the first device ID. In the case of partially reading out the handwriting data, the data acquiring section 32 may impose a search condition relating to the creation time, creation place, and so forth of the handwriting data, or may extract a predetermined ratio (amount) of the handwriting data at random.

In a step S33, the device control section 36 identifies past written information that is a display target from the handwriting data read out in the step S32. Here, the "written information" is written-by-hand information indicated by handwriting, or content information that is specified by handwriting within electronic content such as within an electronic book. For example, the former handwriting corresponds to a written-by-hand note or an annotated comment, and the latter handwriting corresponds to an annotation including an underline and an enclosing line.

In a step S34, the device control section 36 instructs the terminal device 24, from which the predetermined operation has been received in the step S31, to display the written information identified in the step S33. Specifically, the device control section 36 sends display data used to display the written information toward the terminal device 24 that is the transmission destination. The terminal device 24 receives the display data from the digital ink server 12 via the network NW and the IoT hub 16.

In a step S35, the terminal device 24 displays the written information on a display screen by using the display data supplied together with the instruction in the step S34. The terminal device 24 may display plural pieces of written information, in turn, sequentially in time-series order, or may display plural pieces of written information, in turn, in random order. In the displaying, various display forms may be used (for example, size of characters, color, position, orientation, whether or not display of a time stamp exists, and so forth), and various control methods may be used (for example, display time, display switching cycle, visual effects, and so forth).

Figure 10A:
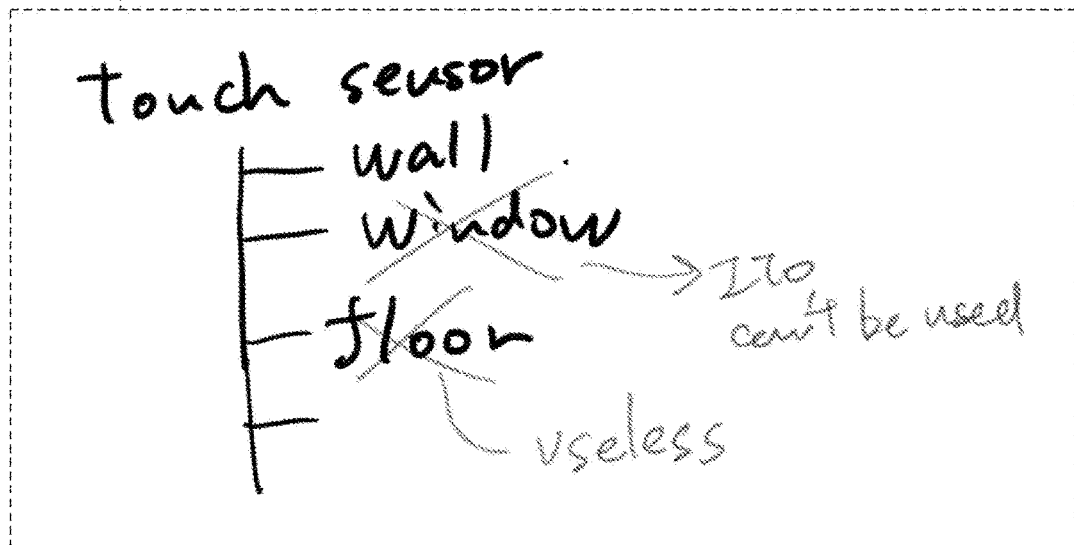
FIG. 10A is a diagram illustrating one example of a display on a terminal device.
Figure 10B:
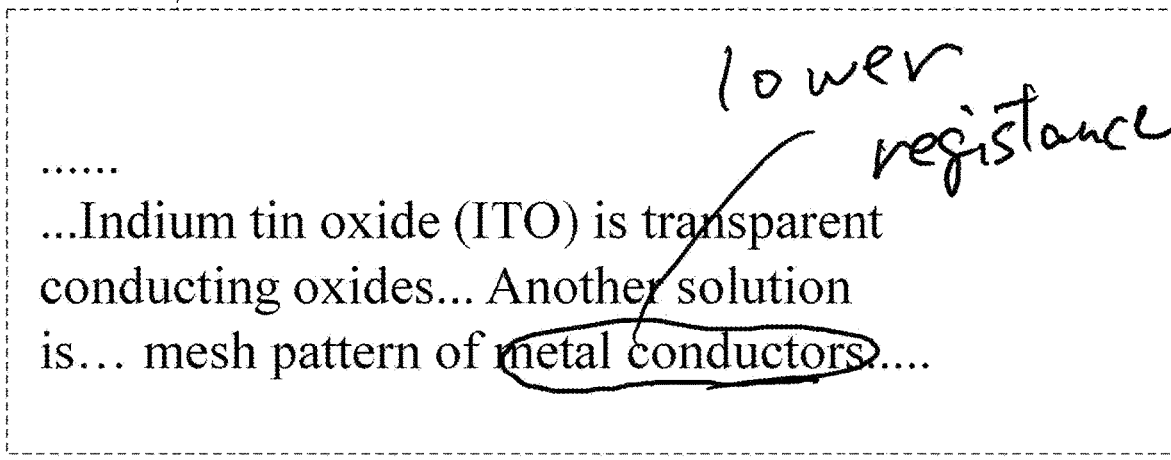
FIG. 10B is a diagram illustrating one example of a display on the terminal device.

FIG. 10A and FIG. 10B are diagrams each illustrating one example of display on the terminal device 24. It is assumed that the terminal device 24 displays plural pieces of written information, in turn, including: (A) written-by-hand information 111 at a writing timing T1, and (B) content information 112 at a writing timing T2, which are displayed in turn. The writing timing T1 may be a timing considerably earlier than the writing timing T2 (for example, several years prior).

The written-by-hand information 111 of FIG. 10A represents a note relating to the applicability of a touch sensor. Specifically, at the writing timing T1, it is determined that a touch sensor composed of indium tin oxide (ITO) can be applied to/in the wall, whereas application to the "window" is technically difficult and application to the "floor" is meaningless. The content information 112 of FIG. 10B indicates a technological trend relating to the touch sensor. Specifically, at the writing timing T2, it has been suggested that forming a touch sensor using a metal mesh pattern is highly feasible.

Person Hm, by visually recognizing the display, realizes that it is technically feasible to incorporate a touch sensor into a window, which leads to creation of a "home UI system" as a new business model, in which a "house itself" functions as an input-output device of digital ink.

After the step S35 in FIG. 9, the third operation returns to the step S31, and the operation according to the flowchart is repeatedly carried out to successively execute the third operation of the home UI system 10.

Effects of Third Operation

As described above, the home UI system 10 that manages digital ink includes the plural home-use devices 20 and 22 that are arranged in the house 100 or that form part of the house 100 and that each include the handwriting sensor 52 capable of inputting handwriting by person Hm. The home UI system 10 also includes the storage device 14 that stores handwriting data that indicates the form of handwriting in such a manner that the handwriting data is associated with the home-use device 20 or 22. The home UI system 10 also includes the terminal device 24 that is configured to display an image or video and is associated with one or more home-use devices 20 and 22. The home UI system 10 includes the device control section 36 (controller) that, when receiving a predetermined operation through the terminal device 24, acquires from the storage device 14 handwriting data of the home-use devices 20 and 22 corresponding to the terminal device 24, and that instructs the terminal device 24 to display written-by-hand information indicated by the acquired handwriting data or content information specified by the acquired handwriting data.

In a display method and a display program that use the home UI system 10, the digital ink server 12 as a computer carries out an instruction step (S34 in FIG. 9) of acquiring, when receiving a predetermined operation through the terminal device 24, handwriting data of the home-use devices 20 and 22 corresponding to the terminal device 24 from the storage device 14, and instructing the terminal device 24 to display written-by-hand information indicated by the acquired handwriting data or content information specified by the acquired handwriting data. This makes it possible to display previously written information input to the home-use devices 20 and 22 as an image or video in a consolidated manner on the specific terminal device 24, and to effectively output handwriting information indicated by the digital ink.

In particular, when the terminal device 24 displays plural pieces of handwritten information or plural pieces of content information in turn at random, it becomes possible to successively present combinations of pieces of fragmented information that person Hm may not think of. Thus, organic linkage of pieces of information in various perspectives may be readily formed in the brain of person Hm, which leads to further creative activity of person Hm.

Fourth Operation

Person Hm, by looking back on memories in the past, may obtain physical and mental effects such as psychological comfort, activation of the brain, and a feeling of belonging to home. The home UI system 10 may be configured to perform the "fourth operation" to trigger recollection of the content of writing in the past. The fourth operation will be described below with reference to a flowchart of FIG. 11 and FIG. 12A to FIG. 13C.

Flow of Fourth Operation

Figure 11:
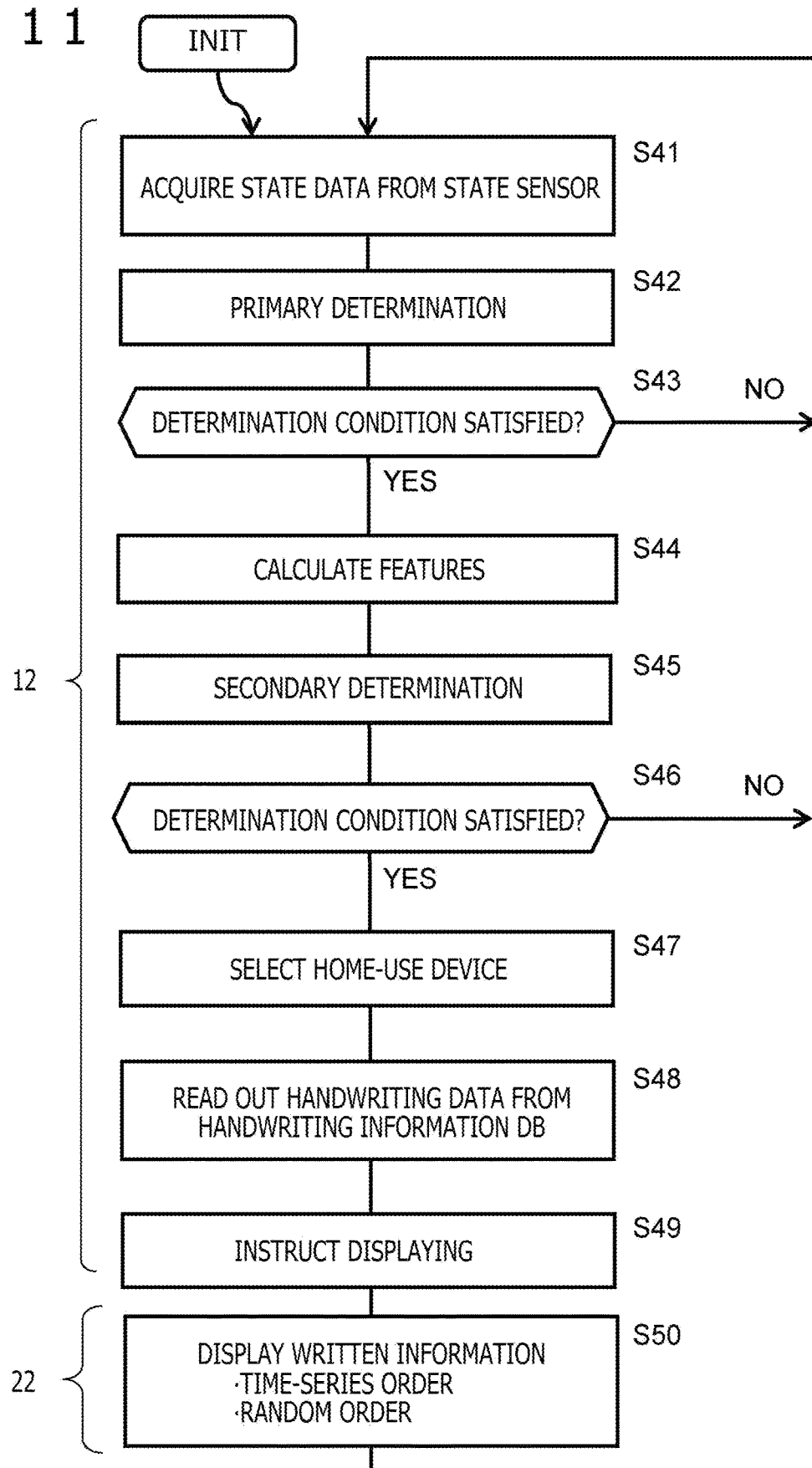
FIG. 11 is a flowchart of a fourth operation of the home UI system.

In a step S41 in FIG. 11, the data acquiring section 32 of the digital ink server 12 acquires state data from one or plural state sensors 18. This acquisition is an operation similar to the acquisition made in the step S11 in FIG. 4, and thus specific description thereof is omitted.

In a step S42, the data analyzing section 34 carries out primary determination relating to whether or not a notification is necessary by using the state data acquired in the step S41. Specifically, the data analyzing section 34 analyzes the state data from multiple perspectives or in a time-series manner by using various analytical methods including sensor fusion, and checks whether or not a predetermined state of person Hm has been detected. Here, the "predetermined state" may mean, for example, the state in which person Hm relaxes near the home-use device 20 or 22. Examples of such state include: [1] the state in which person Hm sits in a chair or sofa, [2] the state in which person Hm stands still, [3] the state in which person Hm is viewing the specific home-use device 20 or 22, and so forth.

In a step S43, the data analyzing section 34 checks whether or not the determination result in the step S42 satisfies a primary determination condition. When the determination condition is not satisfied (step S43: NO), the operation returns to the step S41 and the steps S41 to S43 are sequentially repeated until the condition is satisfied. On the other hand, when the determination condition is satisfied (step S43: YES), the operation proceeds to the next step S44.

In the step S44, the data analyzing section 34 calculates plural features used for secondary determination from the state data acquired in the step S41 or state data additionally acquired. The data analyzing section 34 may calculate the same features as in the case of the step S14 in FIG. 4 or may calculate different features.

In a step S45, the data analyzing section 34 carries out secondary determination relating to whether or not displaying to be described later is necessary, by using the features calculated in the step S44. For example, the data analyzing section 34 can determine whether or not displaying is necessary depending on whether or not plural individual conditions are all satisfied or through converting satisfaction and non-satisfaction of the plural individual conditions to a score. Alternatively, the data analyzing section 34 may carry out the determination with higher accuracy by using a determination implement 90 in which machine learning has been carried out. This determination implement 90 can employ a configuration similar to that of the determination implement 70 illustrated in FIG. 5.

In a step S46, the data analyzing section 34 checks whether or not the determination result in the step S45 satisfies a secondary determination condition. Here, the data analyzing section 34 determines that the determination condition is satisfied when a determination value output from the determination implement 90 is larger than a threshold. On the other hand, the data analyzing section 34 determines that the determination condition is not satisfied when the determination value is equal to or smaller than the threshold. When the determination condition is not satisfied (step S46: NO), the operation returns to the step S41, and the steps S41 to S46 are sequentially repeated until the condition is satisfied. On the other hand, when the determination condition is satisfied (step S46: YES), the operation proceeds to the next step S47.

In the step S47, the data analyzing section 34 selects, based on the analytical result in the step S42, one home-use device 22 that is present near person Hm and that has a touch panel display. Alternatively, the data analyzing section 34 may select the home-use device 22 through collation of the sensor information 42 and the first device information 44 similarly to the case of the step S17 (FIG. 4).

In a step S48, the data acquiring section 32 reads out handwriting data of the home-use device 22 selected in the step S47 from the handwriting information DB 38. Written-by-hand information indicated by handwriting is included in the handwriting data. In the case of partially reading out the handwriting data, the data acquiring section 32 may impose a search condition relating to the creation time, creation place, and so forth of the handwriting data, or may extract a predetermined ratio (amount) of the handwriting data at random.

In a step S49, the device control section 36 sends out display data including the handwriting data read out in the step S48 toward the home-use device 22 selected in the step S47. The home-use device 22 receives the display data from the digital ink server 12 via the network NW and the IoT hub 16.

In a step S50, the home-use device 22 displays written information on a display screen by using the display data supplied in the step S49. Similarly to the case of the step S35 (FIG. 9), the home-use device 22 may display plural pieces of written information, in turn, in time-series order or may display plural pieces of written information, in turn, in random order. In the displaying, various display forms may be used (for example, size of characters, color, position, orientation, whether or not display of a time stamp exists, whether or not display of the writing person exists, and so forth), and various control methods may be used (for example, display time, switching cycle, visual effects, and so forth).

FIG. 12A to FIG. 12C are diagrams illustrating a first example of the display by the home-use device 22. Here, the home-use device 22 is a tablet with which an electronic book can be viewed, and which can display plural pieces of written information including pieces of content information 121, 122, and 123 extracted at random, in turn. The content information 121 of FIG. 12A indicates an annotation written to a part of a nursery rhyme. The content information 122 of FIG. 12B indicates an annotation written to a part of a fairy tale. FIG. 12C illustrates an annotation written to a mathematical diagram.

FIG. 13A to FIG. 13C are diagrams illustrating a second example of the display by the home-use device 22. Here, the home-use device 22 is a table including a touch panel display and is configured to display plural pieces of written information including pieces of written-by-hand information 124, 125, and 126 extracted at random, in turn. The written-by-hand information 124 of FIG. 13A is a shopping list written by a "mother." The written-by-hand information 125 of FIG. 13B is an illustration written by a "father." FIG. 13C is a message written by a "child."

The home-use device 22 carries out displaying various content, in turn, at a constant slow cycle as with the slow cycle of a pendulum clock. Person Hm, by visually recognizing the display which does not appear to have any special meaning, may become attached to the home-use device 22 and be triggered to remember memories of the house 100. Person Hm may feel the sense of belonging to the house 100.

After the step S50 in FIG. 11, the operation returns to the step S41, and the operation according to the flowchart is repeatedly carried out to successively execute the fourth operation of the home UI system 10.

The digital ink server 12 may carry out, concurrently with the fourth operation, reinforcement learning for the determination implement 90 (FIG. 5) that carries out the secondary determination. The reinforcement learning may be carried out based on a learning scheme in which "whether or not displaying is made" is used as the action selection and "the existence of reaction by person Hm" is used as the reward, for example. The digital ink server 12 may carry out similar learning (that is, cleansing processing of conditions) also for the primary determination.

Effects of Fourth Operation

As described above, the home UI system 10 that manages digital ink includes one or plural state sensors 18 capable of detecting a state in the house 100 or a change in the state, and the home-use device 22 that is arranged in the house 100 or that forms part of the house 100 and that includes a touch panel display capable of inputting and outputting handwriting by person Hm. The home UI system 10 also includes the storage device 14 that stores handwriting data that indicates the form of handwriting in a manner such that the handwriting data is associated with the home-use device 22. The home UI system 10 includes the device control section 36 (controller) that, when it is determined that displaying is necessary based on a detection result of one or more of the state sensors 18, acquires from the storage device 14 handwriting data corresponding to the home-use device 22 located near person Hm, and instructs the home-use device 22 to display written-by-hand information indicated by the acquired handwriting data.

In the display method and the display program that use the home UI system 10, the digital ink server 12 as a computer carries out, when it is determined that displaying is necessary from a detection result of one or more of the state sensors 18, acquiring from the storage device 14 handwriting data corresponding to the home-use device 22 located near person Hm and carrying out the instruction step (S49 in FIG. 11) of instructing the home-use device 22 to display written-by-hand information indicated by the acquired handwriting data. This allows for timely displaying of content for person Hm, taking into account the state, or a change in the state, of person Hm who indicates a high interest in the home-use device 22, and makes it possible to effectively output written information previously input from the home-use device 22 as an image or video.

In particular, when the home-use device 22 displays plural pieces of written-by-hand information, in turn, at random, it becomes possible for person Hm to successively look back on memories of the past, which would trigger physical and mental effects such as psychological comfort and activation of the brain. Furthermore, by carrying out display in a mode that seems not to have a special meaning, person Hm may experience the sense of being present and belonging in the house 100 to remember memories of the house 100.

The data analyzing section 34 (determination unit) may determine whether or not displaying is necessary by using the determination implement 90 that uses at least one feature indicating a detection result of the state sensor 18 on the input side and that uses the determination value indicating whether or not displaying is necessary on the output side. The device control section 36 may instruct displaying according to the determination result by use of the determination implement 90. This determination implement 90 may be configured to allow the learning parameter group defining the calculation rule to be updated by reinforcement learning.

Modification Examples

The present disclosure is not limited to the above-described embodiments and various modifications are possible. Further, various configurations may be selectively combined as long as technical contradiction is not created.

Regarding the step S15 (FIG. 4) of the first operation or the step S45 (FIG. 11) of the fourth operation, the data analyzing section 34 may determine whether or not a notification or displaying is necessary by using a feature that indicates the degree of affinity between the home-use device 20 or 22 and the house 100. This feature may be calculated based on an image taken by a camera, or may be stored in advance in the first device information 44.

Regarding the steps S12 and S15 (FIG. 4) of the first operation or the steps S42 and S45 (FIG. 11) of the fourth operation, in the case of carrying out the two-stage determination relating to whether or not a notification or displaying is necessary, a device on the downstream side (for example, IoT hub 16 in FIG. 1) may be configured to perform the function of the primary determination. This allows distributed processing by edge computing, and the load on the digital ink server 12 is alleviated.

Furthermore, the data analyzing section 34 may carry out the primary determination by using a relatively smaller number of state sensors 18 and carry out the secondary determination by using a relatively larger number of state sensors 18. This can alleviate the communication load on a link with the state sensors 18. Similarly, the data analyzing section 34 may carry out the primary determination by using determination processing, in which the amount of calculation per instance of processing is relatively smaller, and carry out the secondary determination by using determination processing, in which the amount of calculation per instance of processing is relatively larger. This can alleviate the calculation load on the digital ink server 12.

Regarding the step S19 (FIG. 4) of the first operation, the notification device 58 may carry out the notifications, plural times at different times. For example, the notification device 58 may carry out a first notification in an output form having relatively lower directivity (for example, sound) and thereafter carry out a second notification in an output form having relatively higher directivity (for example, light).

Regarding the step S48 (FIG. 11) of the fourth operation, the data acquiring section 32 may limit handwriting data that is read out from the handwriting information DB 38 according to a disclosure limitation set in advance. This allows for protecting private information that should not be shown to anyone even at home, to thereby increase the utility of the home UI system 10.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A home user interface system that manages digital ink, the home user interface system comprising:
    a plurality of state sensors capable of detecting a state in a house or a change in the state;
    a plurality of home-use devices that are provided in the house or that form part of the house and that each include a handwriting sensor capable of detecting handwriting by a person, the plurality of home-use devices including home appliances, or furniture, or home accessories or equipment;
    one or more notification units configured to perform a notification to notify the person of existence of one of the plurality of home-use device or a detectable region of the handwriting sensor;
    a determination unit configured to check, based on a detection result from one or more of the plurality of state sensors, whether or not a precursor of a writing operation on the home-use device is detected to satisfy a primary determination condition, to check whether or not a secondary determination condition is satisfied, and to make a determination that the notification is necessary in response to the primary determination condition and the secondary determination condition being satisfied; and
    a controller which, responsive to the determination that the notification is necessary, instructs at least one of the notification units to carry out the notification,
    wherein the determination unit checks whether or not the secondary determination condition is satisfied in response to the primary determination condition being satisfied, and does not check the secondary determination condition in response to the primary determination condition not being satisfied.

2. The home user interface system according to claim 1, wherein the determination unit performs determination processing to determine whether or not the notification is necessary, by using a determination implement that uses at least one feature indicating the detection result from one or more of the plurality of state sensors on an input side and that uses a determination value indicating whether or not the notification is necessary on an output side.

3. The home user interface system according to claim 2, wherein
the determination unit checks whether or not the secondary determination condition is satisfied using the determination implement that one or more of a plurality of features indicating the detection result from one or more of the plurality of state sensors on the input side and that uses the determination value indicating whether or not the notification is necessary on the output side.

4. The home user interface system according to claim 3, wherein
the determination implement is configured to allow a learning parameter group defining a calculation rule to be updated by reinforcement learning.

5. The home user interface system according to claim 3, wherein
the plurality of features include at least one of handwriting features relating to a form of handwriting, time features relating to timing of handwriting, place features relating to a place of handwriting, physical features relating to a body of the person, or motion features relating to a motion of the person.

6. The house user interface system according to claim 1, wherein
the primary determination condition indicates state data acquired from a relatively smaller number of the state sensors, and the secondary determination condition indicates state data acquired from a relatively larger number of the state sensors.

7. The home user interface system according to claim 1, wherein
responsive to a detection by one of the plurality of home-use devices of a handwriting input, the determination units estimates the person who has inputted the handwriting based on the detection result from one or more of the plurality of state sensors.

8. The home user interface system according to claim 1, wherein
the at least one of the notification units carries out the notification plural times at different times.

* * * * *